(12) United States Patent
Kostelyk

(10) Patent No.: US 7,730,561 B2
(45) Date of Patent: Jun. 8, 2010

(54) USED WATER REMOVAL SYSTEM FOR A PORTABLE, HAND-WASH SINK STATION

(75) Inventor: Jamie Phillip Kostelyk, Hammond, IN (US)

(73) Assignee: PolyJohn Enterprises Corporation, Whiting, IN (US)

( * ) Notice: Subject to any disclaimer, the term of this patent is extended or adjusted under 35 U.S.C. 154(b) by 1137 days.

(21) Appl. No.: 11/365,893

(22) Filed: Feb. 28, 2006

(65) Prior Publication Data

US 2007/0199146 A1 Aug. 30, 2007

(51) Int. Cl.
*A47K 1/00* (2006.01)
(52) U.S. Cl. .......................................... 4/625
(58) Field of Classification Search ...... 4/516, 4/518, 619, 620, 624–628
See application file for complete search history.

(56) References Cited

U.S. PATENT DOCUMENTS 5,257,423 A * 11/1993 Jacobsen et al. ............... 4/630
5,465,438 A * 11/1995 Allman et al. ................. 4/626
5,687,434 A * 11/1997 Tagg ............................. 4/625

* cited by examiner

*Primary Examiner*—Huyen Le
(74) *Attorney, Agent, or Firm*—Harness, Dickey & Pierce, P.L.C.

(57) ABSTRACT

A used water removal system for a stand-alone hand-wash sink station having a vertically elongated used water storage tank and within which a vertically elongated, fresh water tank is positioned. A sink basin disposed above the used water storage tank drains used water into the used water storage tank. A water line conveys water from the fresh water tank to a faucet located above the sink basin. An inverted, vertically elongated, U-shaped tube is arranged within the station alongside the fresh water tank. One end of the tube opens into the used water storage tank near its lower end. The second end of the tube opens to the outside of the station. The curved bight of the tube is located at a height that is above the maximum height of the used water within the used water storage tank. Water may be rapidly removed from the tank by temporarily applying suction to the second end of the tube to siphon used water through the tube and out of the used water storage tank.

19 Claims, 9 Drawing Sheets

USED WATER REMOVAL SYSTEM FOR A PORTABLE, HAND-WASH SINK STATION

BACKGROUND OF INVENTION

This invention relates to an improved system for draining the used water holding tank of a portable, stand-alone hand-wash sink.

A portable stand-alone sink station, such as described in U.S. Pat. No. 5,687,434, issued Nov. 18, 1997 to Richard Leach Tagg, comprises, in general, a housing which contains a fresh water tank and a used or "grey" water holding tank. One or more sink bowls or basins are mounted above the tanks. Fresh water is periodically supplied to the fresh water tank and the used water is removed. The fresh water is pumped, such as by a conventional foot-operated pump, from the fresh water tank to a faucet or spigot located above each sink bowl. When the user of the sink operates the faucet or spigot, the fresh water pours downwardly into the bowl and, from the bottom of the bowl, into a used water holding tank.

The used water holding tank can hold a little more than the amount of fresh water held in the fresh water tank. Therefore, the used water tank must be emptied when the fresh water tank is replenished or when the water must be removed for maintenance or storage of the sink unit. One way of emptying the used water tank is to provide a normally closed outlet at the bottom of the tank. A service or maintenance person may open the outlet and let the water run out. Typically, when the sink unit is in use, the "grey" may be pumped through a hose from an outlet in the used water tank to a tank truck which can carry the used "grey" water to a suitable disposal site or water treatment plant.

Ordinarily, when the hand-wash station or unit is in use, it is arranged at the location of one or more portable chemical toilets. Thus, the users of the toilets can wash in the sink stations when desired. The portable chemical toilets are typically placed, for example, at construction sites, or sites where crowds gather, such as at public events like parades, sporting events, etc. Similarly, portable sink units may be positioned near these portable chemical toilets for public use.

When portable sink units are to be provided at use sites to enable the units to be lifted easily, they are emptied of water during the transportation to, and the positioning at, the sites where they are used. At that point, the installer or maintenance person fills the fresh water tank. Usually the fresh water for filling is carried by a maintenance truck in a fresh water tank. Thereafter, a maintenance worker periodically may inspect the unit to determine the level of fresh water in the tank and, also, to determine the level of used water held in the unit. At appropriate times, the used water, which fills or substantially fills the used water tank, is drained and the fresh water supply replenished.

Both the fresh water and used water holding tanks must be emptied when the sink units are moved from one use location to another or to a storage location, or to be closed for the winter in locations where the temperature is cold enough to cause the water to freeze. In the past, drain outlets at the bottoms of the tanks provided for such drainage.

In many places, there are objections to or prohibitions against draining the tanks by opening the tank drain outlets and letting the water run out of the tanks upon the adjacent ground. Further, in ordinary use, the service person must be able to maintain the sink unit, that is, replace fresh water, remove used water and replace the items that are used with a sink, such as soap, paper towels, etc., as quickly as possible. Ordinarily, the used water holding tank is emptied by sucking the water out through a pipe connected to a used water tank, through a vacuum system, on the maintenance truck. Filling the fresh water tank is usually accomplished by pumping water into the fresh water holding tank from a water tank on the truck with a long hose. Hence, it is desirable to provide a way to quickly empty the used water tank of the portable sink unit to reduce the time for servicing the units. To simplify emptying and filling the water tank, it is desirable to locate the water drain outlets or parts at one location, preferably at the front of the unit. That simplifies manually connecting water hoses to the service truck.

Thus, this invention is concerned with a system which provides for rapid removal of used water from the grey water holding tanks on portable wash basin stations by the conventional suction or vacuum equipment that is normally carried by portable chemical toilet maintenance vehicles for cleaning portable toilet waste holding tanks.

SUMMARY OF INVENTION

The invention herein contemplates providing a drain system for a stand-alone, portable, hand-wash sink station formed of an outer used water holding tank, which is referred to as "grey" water, which surrounds a fresh water storage tank. Fresh water is poured into the fresh water tank. A pump, such as a conventional foot-operated pump, pumps water from the fresh water tank to a spigot or faucet located above the tanks. A sink bowl is located between the faucet and the used water holding tank. Water that enters the sink bowl is drained from the bottom of the bowl into the used water holding tank.

When the used water holding tank is substantially full, that is, when the fresh water tank is substantially empty, fresh water must be added to the fresh water tank. At the same time, the used water must be drained from the used water holding tank.

In addition to any drain outlets that may be provided at the lower ends of the tanks, a system is provided for rapidly siphoning the used water from the used water tank. Thus, the invention herein contemplates providing an inverted, U-shaped, pipe or tube arranged within the housing and extending vertically from the bottom of the housing to a point above the anticipated maximum level of used water in the used water tank.

The pipe essentially comprises a pair of parallel tubular legs joined by a curved bight at their upper ends. The lower end of one leg opens into the used water tank to form a water intake. The lower end of the other leg extends through the wall of the housing to the exterior of the housing to form an exterior water outlet opening or port.

To remove water from the used water holding tank, a conventional suction hose "wand" is connected to the suction hose or pipe that is connected to a maintenance truck vacuum system that is used for sucking out the contents of portable chemical toilet waste-holding tanks. The wand is momentarily applied to the exterior outlet opening or port of the leg of the U-shaped tube. This suction or vacuum in the wand starts a siphon action within the tube. Then, the suction siphon action continues and drains the used water, from the interior of the used water holding tank to the hose that is connected to the truck or where sometimes permitted, to the ground. The suction hose may remain connected to the outlet for flowing the used water into the conventional waste water holding tank on the maintenance vehicle.

Once the siphon action begins, the draining may continue while the service person, who is servicing the portable toilets and the wash sinks, may be engaged in other service activities such as cleaning the waste-holding tanks and the interiors of the cabanas of the adjacent or nearby portable chemical toilets, replenishing supplies such as soap, towels, etc. The waste water from the sink unit that is collected in the maintenance vehicle waste-holding tank may be disposed later into a suitable sewage disposal drain or into some other appropriate sewage disposal site.

Moreover, filling the fresh water tank may be done simultaneously with the siphon tube drain to expedite the emptying of the waste water tank and the refilling of the fresh water tank. This reduces the time needed to service or maintain a sink unit.

Preferably, the tank drain outlets or ports are arranged at one side or corner of the housing so that the servicing may be performed in one place. That avoids unnecessary movements of equipment or the service person. This arrangement further shortens the amount of time needed for servicing the sink station.

Further areas of applicability of the present invention will become apparent from the following detailed description. The detailed description and specific examples, while indicating preferred embodiments of the invention, are intended for purposes of illustration only and are not intended to limit the scope of the invention.

DETAILED DESCRIPTION OF THE PREFERRED EMBODIMENTS

Figure 1:
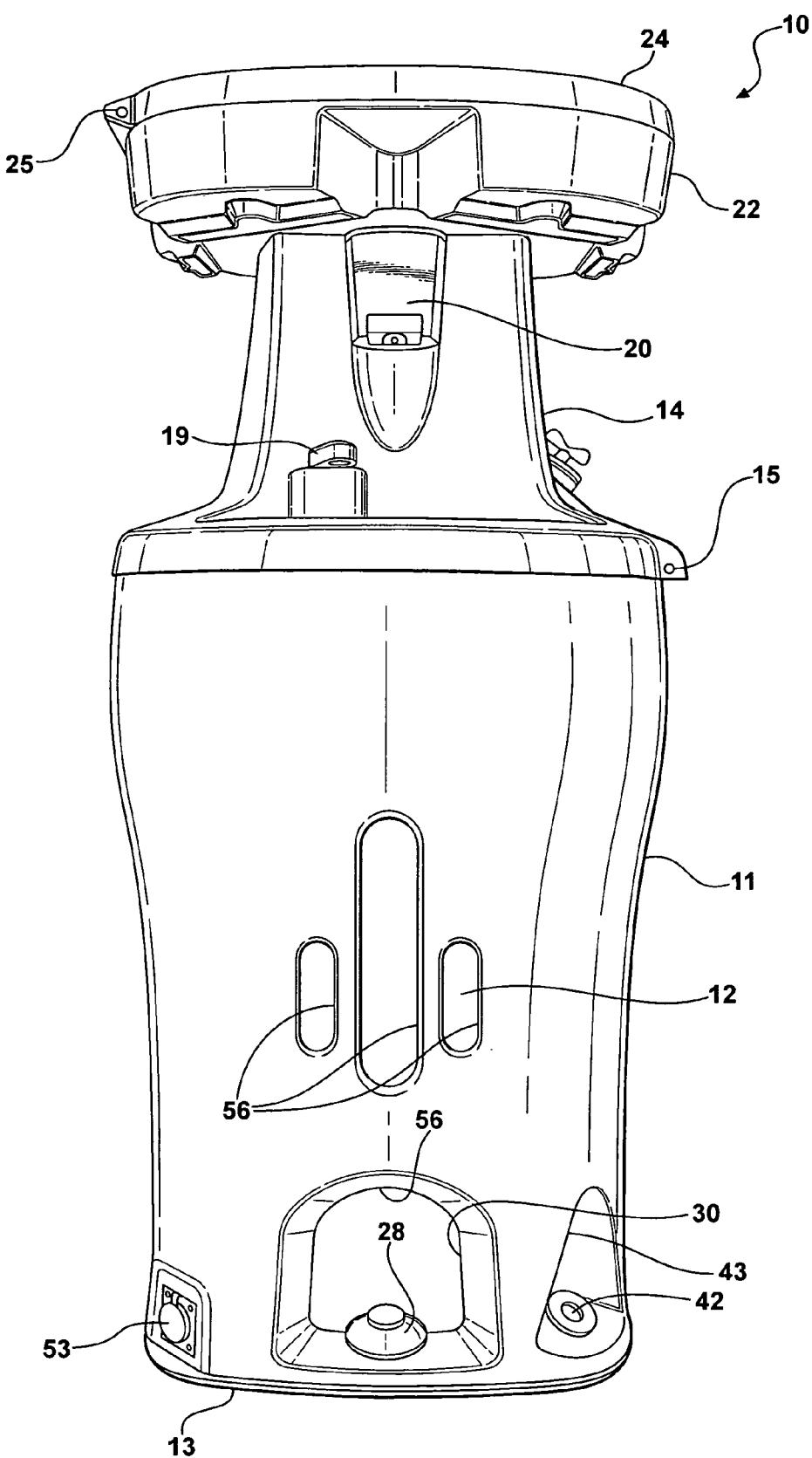
FIG. 1 is a side perspective view of a portable stand-alone hand-wash station.
Figure 2:
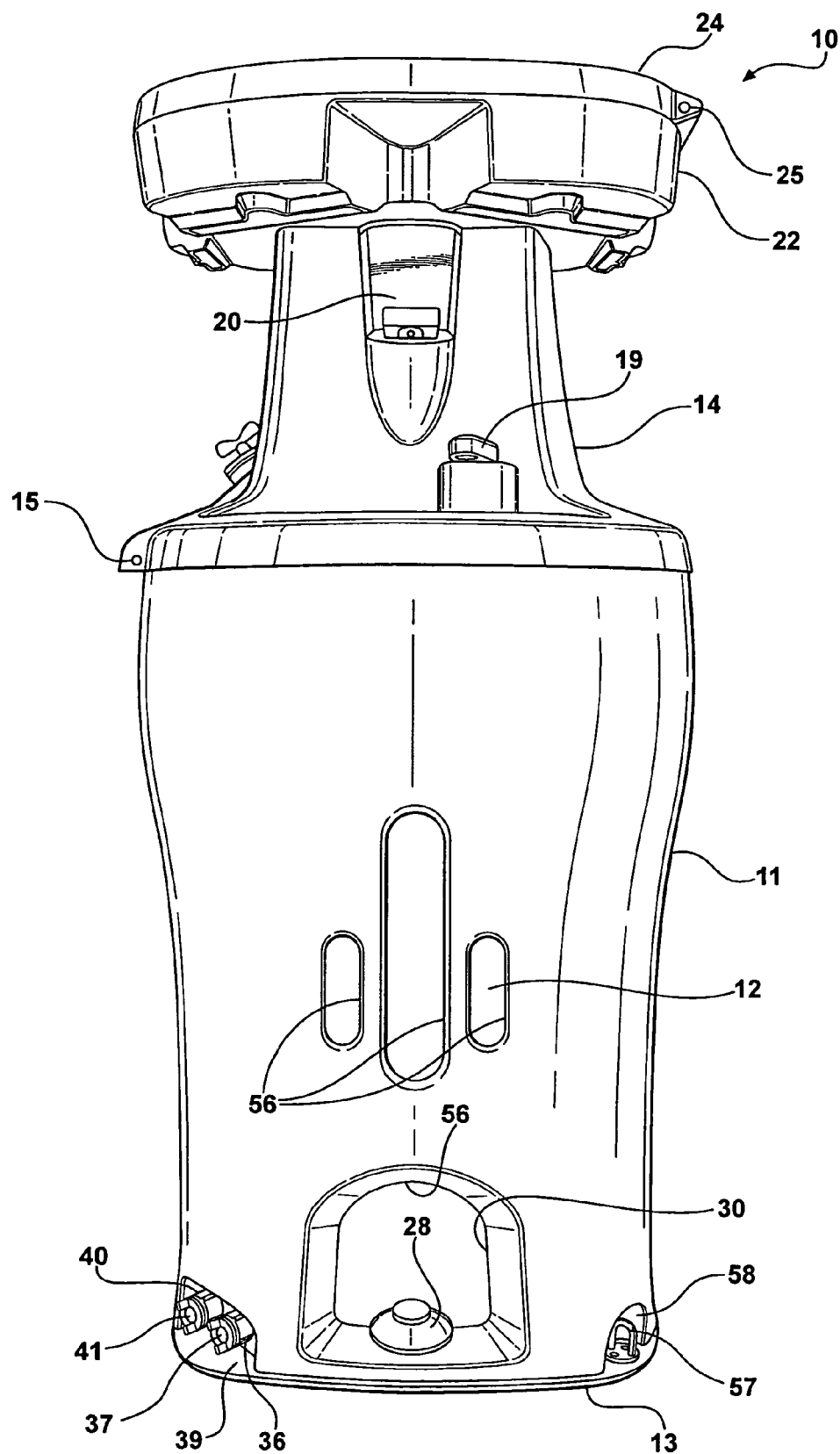
FIG. 2 is a side perspective view, similar to FIG. 1, from the reverse side of the wash station.
Figure 3:
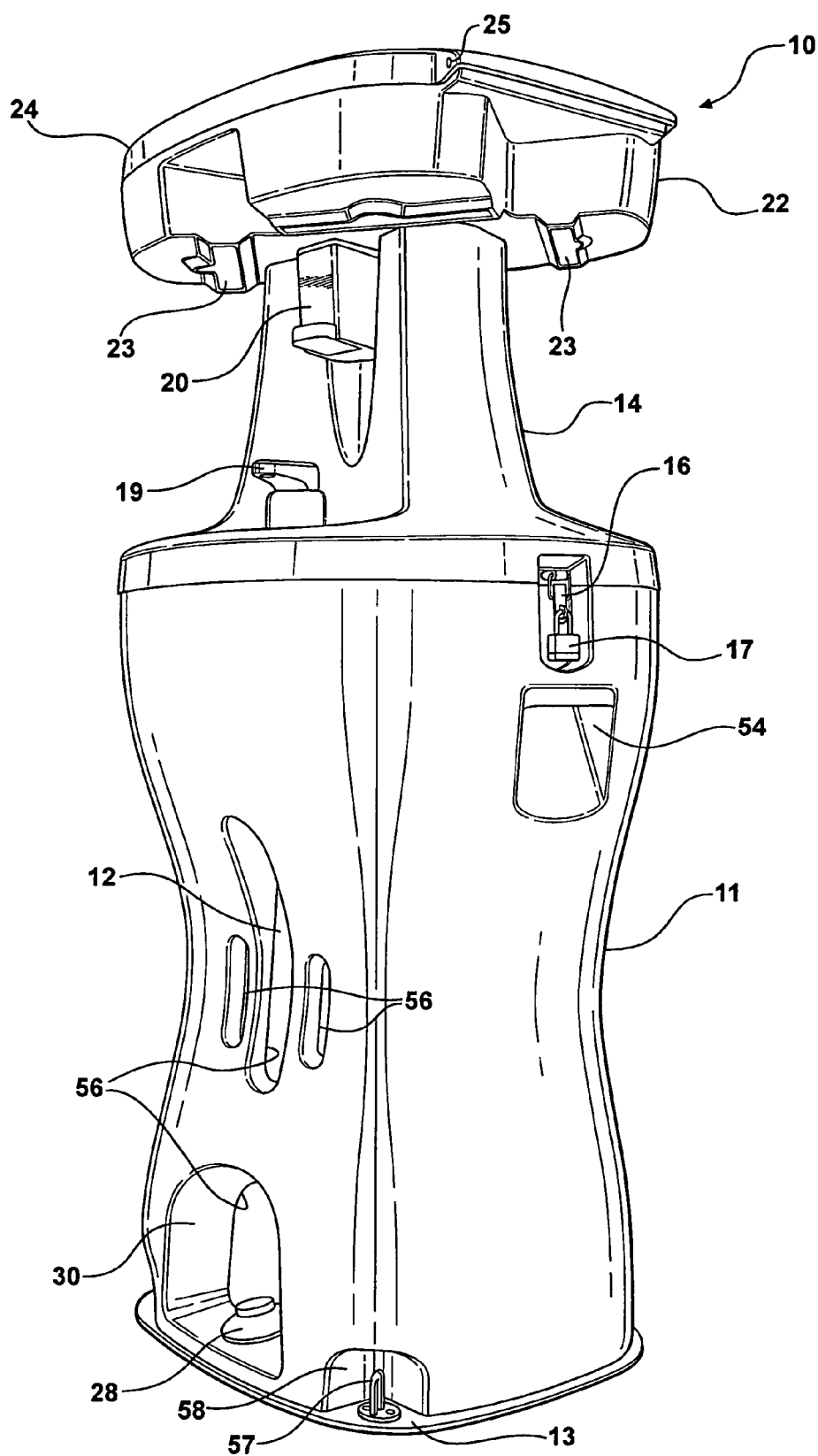
FIG. 3 is an angular side perspective view of the wash station.
Figure 4:
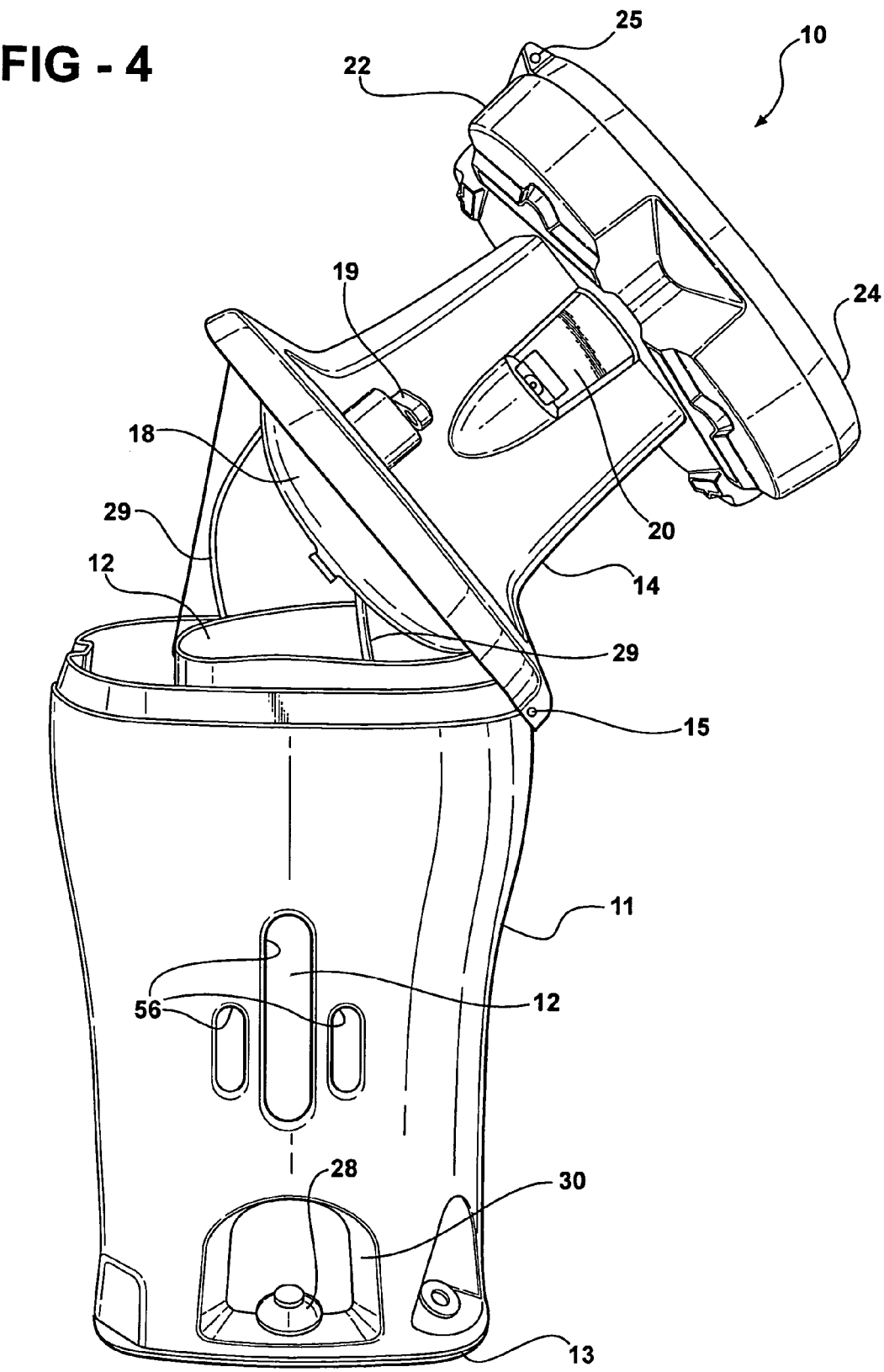
FIG. 4 is a side perspective view of the wash station, showing the upper column of the station in an open, tilted position.
Figure 5:
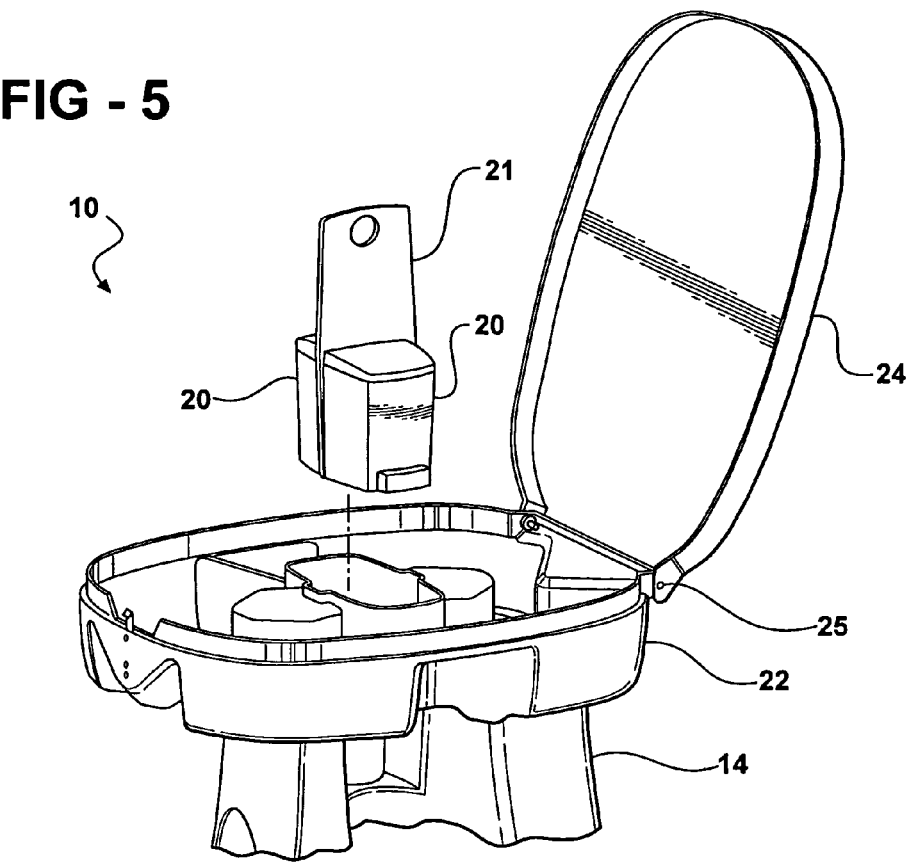
FIG. 5 is a downward side perspective view showing the upper column and hood of the wash station with its lid in an open position, and with the soap dispensers disposed above the hood in a removed condition.
Figure 6:
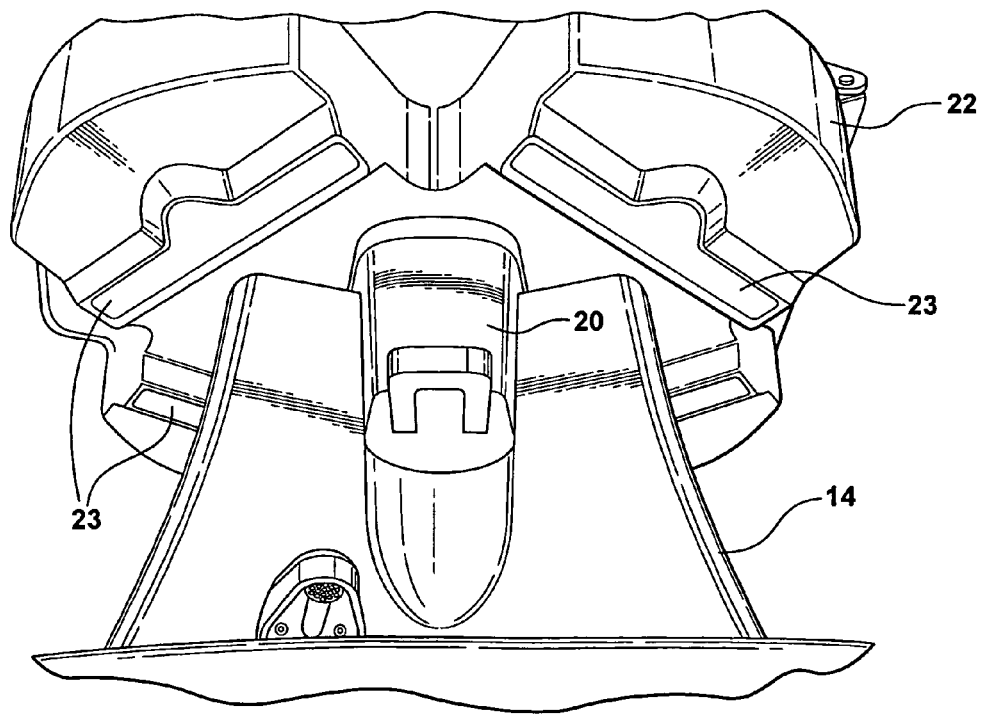
FIG. 6 is an upward side perspective view of the lower surface of the hood of the wash station, showing a soap dispenser and paper towel dispenser slots.
Figure 7:
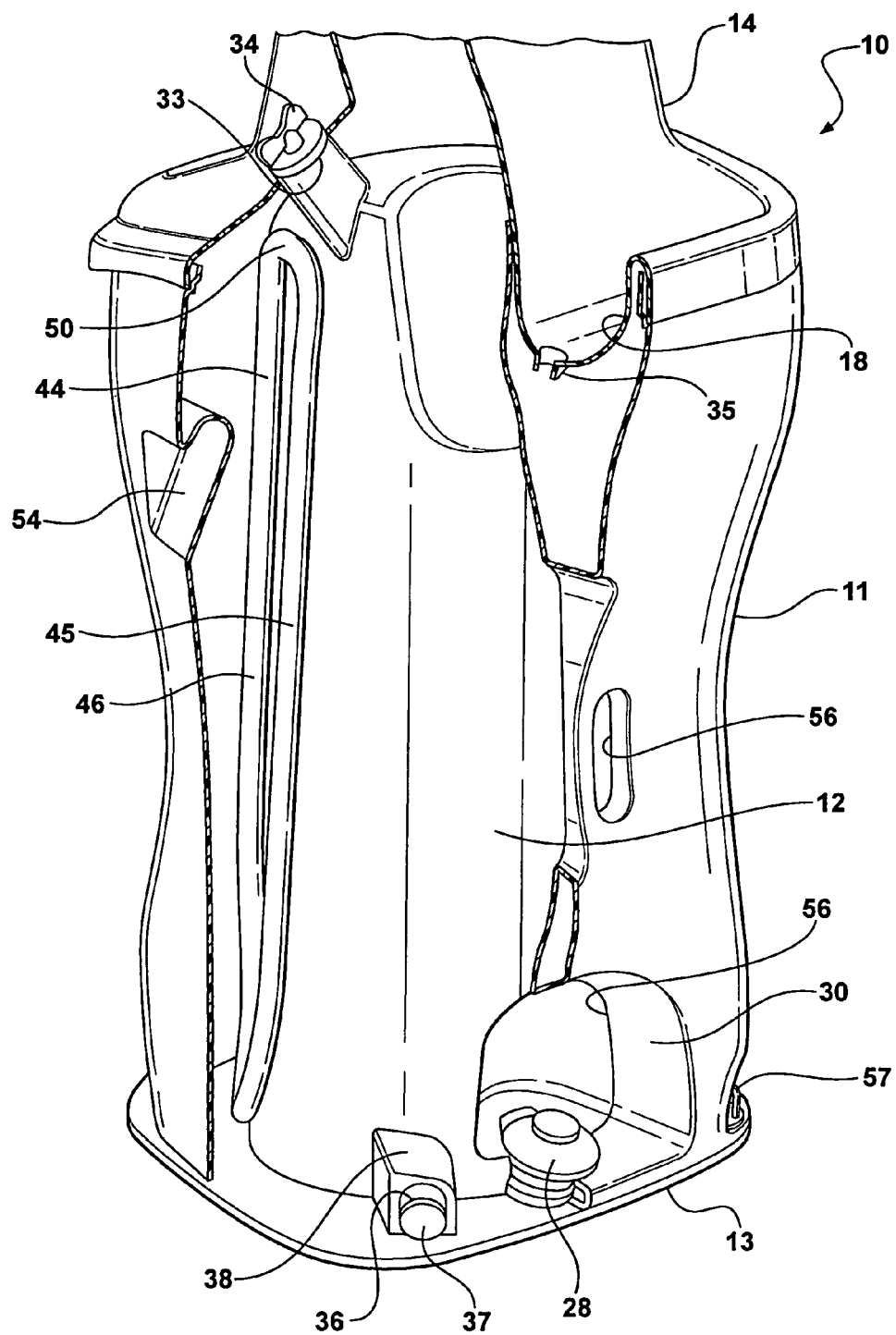
FIG. 7 is a partial cutaway view showing the relationship between the inner fresh water tank and outer used water tank of the wash station, along with a siphon tube.

Referring to the drawings, the stand-alone, portable, hand-wash sink station 10 includes a vertically elongated, used water holding tank 11. The sink station 10 is preferably sized so as to fit within a typical portable restroom. The used water holding tank 11 is formed in the general shape of a tapered oblong annular cylinder, with the annulus closed at its lower end, open at its upper end, and suitable for holding used water. The central portion of the used water holding tank 11 (interior to the annulus) is open at both its upper and lower ends. An inner, fresh water tank 12 is configured to be disposed within the central portion of the used water holding tank 11 by being inserted through the lower opening of the central portion of the used water holding tank 11. Preferably, the used water holding tank 11 and the inner, fresh water tank 12 are formed of molded plastic, although other suitable materials may also be used. It will be appreciated that other suitable shapes for the inner and outer tanks 11 and 12 may be used, with the fresh water tank 12 preferably being disposed within the used water holding tank 11.

The sink station 10 also includes a lower base 13 which attaches to the lower portion of the used water holding tank 11, so as to close the lower central portion of the used water holding tank 11, and to secure the fresh water tank 12 in an inserted position within the central portion of the used water holding tank 11. The sink station 10 further includes an upper column 14 that serves as a sink top or tower. The upper column 14 is attached to the used water holding tank 11 and may be tilted with respect to the used water holding tank 11 by a hinge 15. The upper column 14 may be secured to the used water holding tank 11 through the use of a latch 16 that may be further secured through the use of a lock 17 to resist tampering. The upper column 14 includes two sink bowls or basins 18 that are formed into the lower portion of the upper column 14 on opposite sides of the sink station 10. Thus, two people may use the unit simultaneously. It will be appreciated, however, that other numbers of sinks may be provided. The sink bowls or basins 18 are of a size and shape to allow users to wash their hands and arms up to the elbows, and as such, may protrude into the upper portion of the used water holding tank 11 when the sink station 10 is in an assembled condition.

The upper column 14 further includes two faucets or spigots 19, one disposed above each sink bowl or basin 18 on opposite sides of the sink station 10. Soap dispensers 20 may be provided over each of the sinks 18 and mounted on opposite sides of the upper column 14. The soap dispensers 20 are shown to be mounted together in opposite relation upon a common removable plate 21 that can be easily withdrawn (along with the attached soap dispensers 20) from above the upper column 14 for convenience in refilling by maintenance personnel.

A hood or cap 22, which serves as a paper towel dispenser tray, is disposed upon the upper portion of the upper column 14. The hood or cap 22 may, however, be utilized to hold paper towels or any other materials which are desirable for use with hand washing. The hood or cap 22 is shown to include a plurality of slots 23, from which paper towels (such as the foldable type conventional in the industry) may be retrieved by users of the sink station 10. Four such slots 23 are shown in the drawings, although it will be appreciated that any suitable number may be used. The hood or cap 22 is covered by a lid 24, which may be attached to the hood or cap 22 and may be tilted with respect to the hood or cap 22 by a hinge 25. The hood or cap 22 may also include a lock (not shown) to resist tampering. It will be appreciated that the sink station 10 may also include any other suitable or convenient accessories or attachments to facilitate hand washing. One example of such an additional accessory is an optional hand sanitizer container, shown at 26, and mounted upon a mount plate 27 attached to one side of the upper column 14, in FIG. 8.

Figure 8:
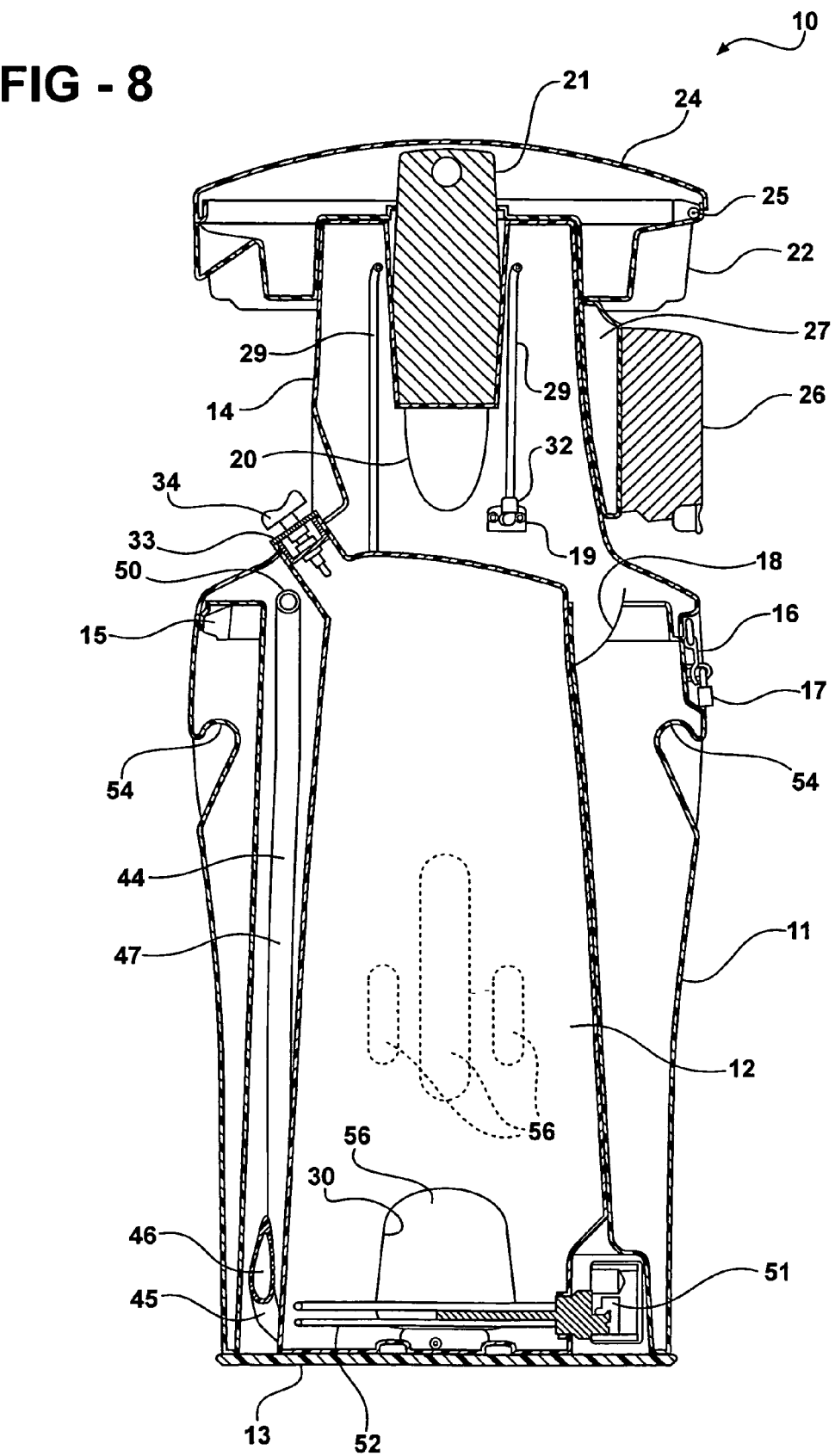
FIG. 8 is a side cross-sectional view of the wash station.
Figure 10:
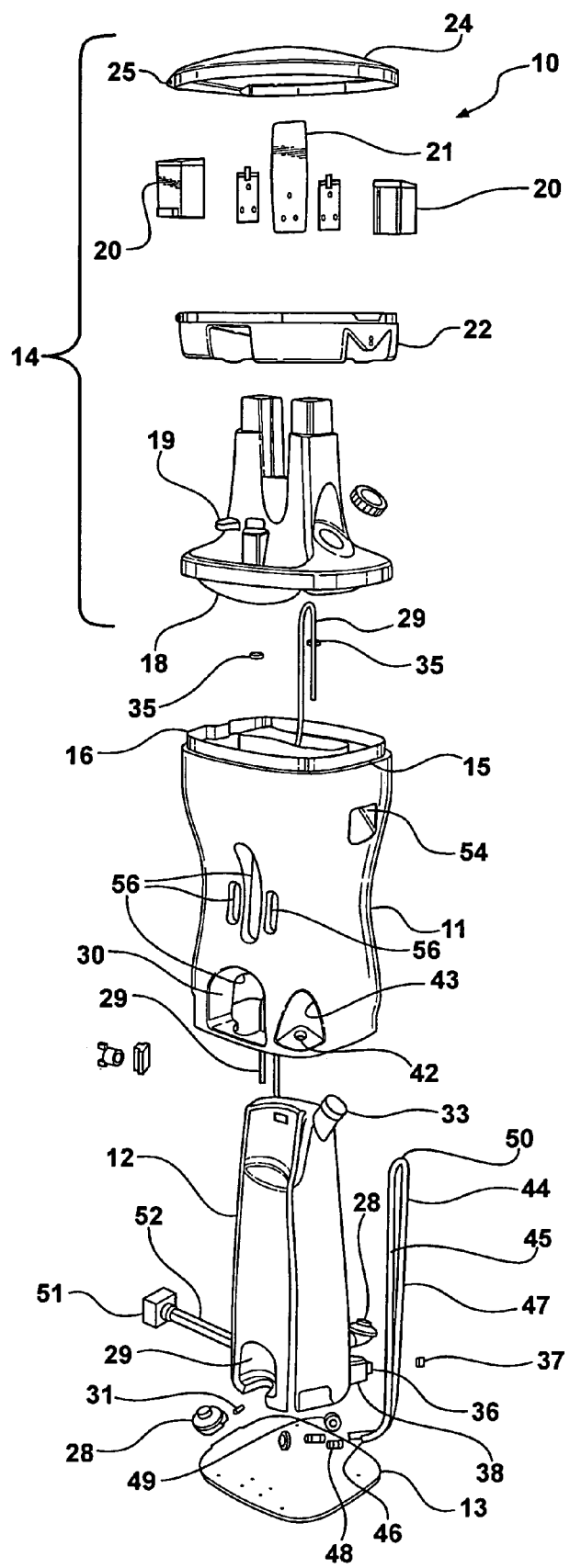
FIG. 10 is an exploded side perspective view showing the components of the wash station.

Water is supplied from the fresh water tank 12 to the faucets 19 through a system which includes two foot-operated pumps 28 which pump water through conduits or pipes 29 when the user of the unit applies foot pressure upon the pumps 28. Suitable pumps for this purpose are commercially available, and they may preferably include check valves (not shown) that will hold a prime between uses. The foot-operated pumps 28 may be ordinary, conventional diaphragm or squeeze-type pumps which operate by applying foot pressure several times for pumping water. The pumps 28 are shown to be disposed within recesses 30 in the lower portion of the used water holding tank 11 on opposite sides of the sink station 10 where the sinks bowls or basins 18 are located. The pumps 28 are connected at 31 to the lower portion of the fresh water tank 12. The conduits or pipes 29 attached to the pumps 28 are disposed to pass between the exterior surface of the fresh water tank 12 and the central interior portion of the used water holding tank 11, and are connected at 32 (FIG. 8) to each of the faucets 19. As shown in FIGS. 8 and 10, the conduits or pipes 29 may extend upwardly through the upper column 14 in a loop-type manner before descending to reach the faucets 19.

Because similar pumps 28 are located at opposite sides of the sink station 10, and have similar connections to opposing faucets 19, two people may wash on opposite sides of the sink station 10. However, it will be realized that any suitable number of pumps 28 may be used in connection with any suitable number of sink basins 18. Fresh water is poured into the fresh water tank 12 through an inlet 33 which is normally closed by a removable cap 34. The removable cap 34 may be locked through an associated lock (not shown), either separately attached or built into the removable cap 34, for resisting tampering with the fresh water supply. During use of the sink station 10, water is pumped through the use of pumps 28 from the fresh water tank 12 through faucets 19 into the areas of the sink basins 18, for use in hand-washing over and within the sink basins 18. Used water from hand-washing flows through drain fittings 35 disposed at the bottom of each sink basin 18 and into the used water tank 11.

At certain times it is desirable to drain water from the fresh water tank 12, such as for transportation or storage. For this drainage, an outlet fitting 36 having a removable plug 37 is formed as an extension 38 of the lower portion of the fresh water tank 12 which protrudes through a notch 39 in the lower portion of the used water tank 11. Removal of the plug 37 allows fresh water to be drained onto the ground until the fresh water tank 12 is substantially empty.

The sink station 10 includes three ways for emptying the used water tank 11. Used water may be drained by gravity from the used water tank 11 through a drain fitting 40 formed upon the exterior surface of the used water tank 11 at its lower portion. The drain fitting 40 has a removable plug 41, and the sink station 10 is designed so that the drain fitting 40 and removable plug 41 are positioned at a lower corner of the sink station 10 next to the outlet fitting 36 and removable plug 37. Such an arrangement of fittings provides for convenient placement and servicing of the sink station 10. Thus, the used water tank 11 may be drained by opening the plug 41 from the drain fitting 40 and letting the water flow out either into a hose which delivers the used water to a collection tank or, where permissible, onto the ground around the unit.

The second method for draining the used water tank 11 involves opening the sink station 10 by releasing the latch 16 and tilting the hinged upper column 14 upwardly with respect to the used water tank 11 to expose the open upper portion of the used water tank 11. Once this is done, the used water may be removed until the used water tank 11 is substantially empty by inserting a suitable wand or tube into the used water tank 11.

The third draining method involves siphoning water from the used water tank 11 through a siphon fitting 42 located within a recess 43 in a lower corner of the used water tank 11. In order to conveniently locate the siphon fitting 42 at a location on the sink station 10 that is likely to be accessible to maintenance personnel, an inverted U-shaped pipe or tube 44 is provided for siphoning water from the used water tank 11 and discharging the water from the sink station 10.

The U-shaped tube 44 is formed of a pipe or tube bent into an inverted U-shape. One leg 45 of the tube 44 has an inlet end 46 that opens into the used water tank. That open end provides a water inlet. The second leg 47 of the tube 44 has an open end 48 that extends through the wall of the used water tank 11 and is fitted with a grommet 49 that forms part of the siphon fitting 42, a water outlet port. The bight or bent upper end portion 50 of the tube 44 is preferably arranged at a height which is above the anticipated maximum level of water in the used water tank 11. Thus, the bight or curved or bent portion of the tube is normally filled with air. That arrangement prevents water from flowing from the used water tank 11, through the tube 44, and out of the sink station 10 until suction is applied to the siphon fitting 42 to produce a siphon effect. In operation, a service wand or other vacuum attachment of the type found on maintenance equipment is applied upon the siphon fitting 42 to create a seal, and a vacuum is applied at the siphon fitting 42 until the used water tank 11 is substantially empty.

Since the unit may be used in cold areas so that the water contained therein may freeze, an electrical heater 51 having a heated rod 52 may be arranged at the lower end of the fresh water tank 12 for providing sufficient heat to the fresh water to provide warm water for hand washing and also to prevent freezing under limited conditions. A conventional, submersible, water heater can be used for this purpose provided there is a suitable electrical energy source available, which may be connected to the sink station at the optional electrical connector 53. In many areas where temporary chemical toilet facilities are used, electricity is available through wires connected to lights or signs or a building under construction, etc. The availability of such electrical power makes it possible to use an electrical heater in those areas.

Since the wash unit is relatively large and bulky, although not too heavy when emptied of water, it may be lifted by hand and placed upon a delivery truck or manually moved to a different location at any time from where it is placed. To assist lifting or carrying the unit, hand grips 54 are formed by indentations in the used water tank 11 which enable maintenance personnel to pick up the sink station 10.

In operation, fresh water that has been poured into the inner fresh water tank 12 is conveyed from the fresh water tank 12 through activation of the pumps 28 and through the tubes 29 to the faucets 19. Preferably, as mentioned above, conventional foot-operated pump 28 would be used for this purpose. Commercially available, manual foot-pressure pumps operate by simply pressing down a number of times upon the pump to operate them. Where electrical power is available an electrical pump may be used. These pumps may be operated by pressing down upon switches which actuate the pump motors. Such pumps are commercially available.

Figure 9:
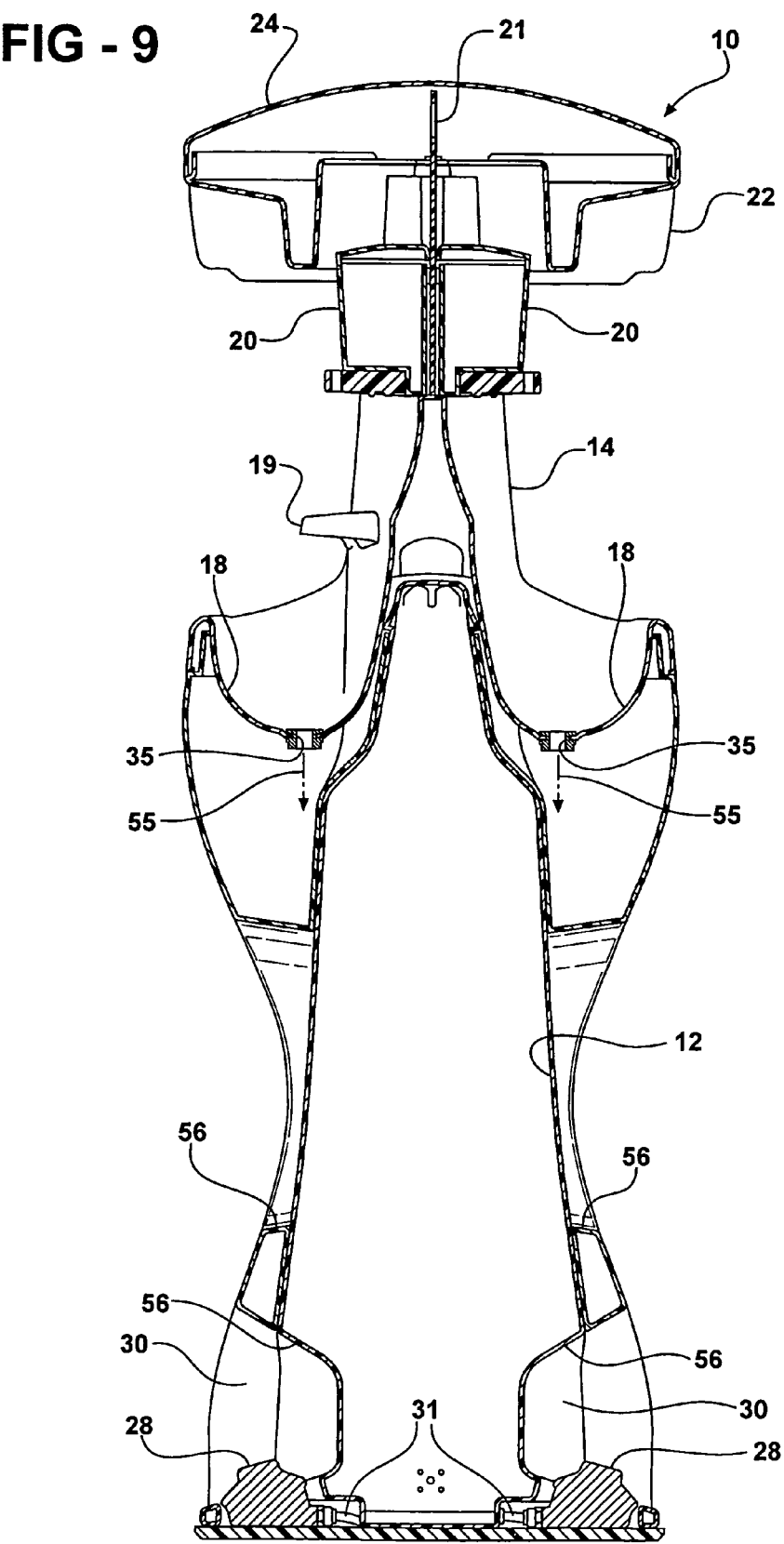
FIG. 9 is a side cross-sectional view of the wash station, taken from a position 90 degrees removed from FIG. 8.

To remove used water which accumulates in the used water tank 11 from the sink basins 18, dotted arrows 55 (FIG. 9) show the movement of the water from the drain fittings 35. The removed water is siphoned out through the U-shaped pipe 44 and flows out through the siphon fitting 42.

With this construction, a serviceperson whose task is to maintain the adjacent portable chemical toilet units as well as the sink stations 10, can apply the end of a vacuum pipe, which is normal equipment on a maintenance truck, to the end of the siphon fitting 42. The vacuum will create a siphon effect to cause water to flow up leg 45, around the bight 50 of the tube down leg 47 and out the open end 48. This will empty the water from the used water tank 11. Since the operation of the siphon can continue without further suction, the service person may then use the suction equipment for the normal, time-consuming tasks of emptying the contents of the waste-holding tanks located in the adjacent chemical toilets. Alternatively, the suction device may be left in place to help remove the water from the tank and through the siphon pipe.

Water exiting from the U-shaped pipe may be allowed to simply pour upon the ground in some places where it is permissible. Usually the grey water is removed through a pipe or hose which is temporarily connected to the end of the U-shaped tube such as by a tubular wand. Then the water is conveyed by a suitable hose or pipe to a waste holding tank on the maintenance vehicle. From there, the used water may be carried away for disposal into an available sewer, recycling or other sanitary water handling system for processing or otherwise disposing of the used water.

In order to determine the level of the water in the fresh water tank 12, one or more sealed openings or windows 56 may be formed within each side of the used water tank 11 by being molded into the side of the used water tank 11. Preferably, the fresh water tank 12 is formed from a translucent plastic, so that an observer can look into the windows 56 and see the fresh water level and determine the amount of water that may be needed to refill the fresh water tank as well as estimate the amount of time needed to empty the used water. As time goes on, and the sink station 10 is used, the fresh water is used and the resulting used water is held within the used water tank 11. When the fresh water is nearly depleted, the fresh water tank 12 may be refilled and the used water tank 11 emptied.

The sink station 10 may also be fitted with other features for enhancing use, security and/or maintenance of the unit. For example, the sink station 10 may include an optional anchor or tie-down ring 57 at one corner of the sink station 10, such as upon the lower base 13 in another recess 58 within a lower corner of the used water tank 11.

Also, although the description above describes the inner tank as containing the fresh water and the outer tank containing the used water, the uses of the two tanks may be reversed for some conditions where it may be desirable to locate the used water in the inner tank and the fresh water in the outer tank. It will be appreciated that additional storage for either or both of the fresh and used water tanks may also be provided, such as through auxiliary tanks located near the station, and connected to the fresh and used water tanks.

This invention may be further developed within the scope of the attached claims. Having fully described a preferred, operative embodiment of this invention, I now claim:

1. A hand-wash sink station comprising:
    a used water storage tank;
    a fresh water tank disposed adjacent to the used water storage tank;
    at least one wash basin disposed above the used water storage tank;
    a fresh water supply faucet arranged in proximity to each wash basin and with the faucet connected to the fresh water tank for providing fresh water to each wash basin when desired;
    a wash basin drain connection between the used water storage tank and each wash basin for draining used water from each wash basin into the used water storage tank; and
    a tube arranged adjacent to the used water storage tank, the tube having one open end opening into a lower end of the used water storage tank to form an inlet, an intermediate section disposed at a height above a highest anticipated level of used water in the used water storage tank, and a second open end forming an outlet, opening to the outside of the sink station for draining water therethrough; whereby, the height of the tube is operable to prevent used water from draining through the tube and out of the used water storage tank without the application of suction to the tube to provide a siphon action for causing the used water to flow through and out of the tube; and
    whereby used water may be siphoned from the used water storage tank upwardly through the intermediate section of the tube to the outlet of the tube when a vacuum is applied to the tube outlet.

2. A hand-wash sink station as defined in claim 1, wherein the used water storage tank is of an annular configuration, and wherein the fresh water tank is disposed within the annulus interior of the used water storage tank.

3. A hand-wash sink station as defined in claim 1, wherein the used water storage tank is of an annular configuration having upper and lower ends, wherein the lower end of the annulus interior is open, and wherein the fresh water tank is inserted within the annulus interior of the used water storage tank from the lower end of the used water storage tank.

4. A hand-wash sink station as defined in claim 3, further comprising a base that is attachable to the lower end of the used water storage tank, for retaining the fresh water tank within the annulus interior of the used water storage tank.

5. A hand-wash sink station as defined in claim 3, wherein the fresh water tank is formed of a translucent material, and wherein the used water storage tank includes at least one sealed opening formed therethrough to allow visual inspection of the water level in the fresh water tank from the exterior of the hand-wash station.

6. A hand-wash sink station as defined in claim 1, wherein the hand-wash station has a plurality of sides, and wherein the hand-wash station includes a plurality of wash basins disposed on said plurality of sides, suitable for use by a plurality of users at the same time.

7. A hand-wash sink station as defined in claim 6, further comprising a plurality of soap dispensers located in proximity to the wash basins, and mounted upon a common plate that is removable from the sink station for refilling.

8. A hand-wash sink station as defined in claim 1, wherein the hand-wash station is of a portable, stand-alone configuration.

9. A hand-wash sink station as defined in claim 1, further comprising a removable upper column disposed above the fresh water tank and the used water storage tank, said upper column including:
    said at least one wash basin;
    at least one soap dispenser; and
    at least one paper towel dispenser.

10. A hand-wash sink station as defined in claim 1, further comprising at least one user-operated pump for delivering fresh water from within the fresh water tank to each wash basin.

11. A hand-wash sink station as defined in claim 1, further comprising a drain fitting upon a lower portion of the fresh water tank disposed adjacent to a drain fitting upon a lower portion of the used water storage tank, both drain fittings being accessible from the exterior of the hand-wash station for draining at least one of the fresh water tank and the used water storage tank when desired.

12. A hand-wash sink station as defined in claim 1, wherein the tube arranged adjacent to the used water storage tank has one open end opening into a lower end of the used water storage tank to form an inlet, an upwardly disposed leg, an intermediate section disposed at a height above a highest expected level of used water in the used water storage tank, a downwardly disposed leg, and a second open end forming an outlet at a lower portion of the hand-wash station.

13. A hand-wash sink station as defined in claim 1, further comprising an electrically-powered heating unit for warming fresh water in the fresh water tank.

14. A portable, stand-alone, hand-wash sink station comprising:
- a vertically elongated used water storage tank having an upper end, a lower end and an open interior section;
- a fresh water tank disposed within the open interior section of the used water storage tank;
- a wash basin with a fresh water supply faucet arranged above the upper end of the used water storage tank and with the faucet connected to the fresh water tank for providing fresh water when desired;
- a wash basin drain connection between the used water storage tank and the wash basin for draining used water from the wash basin into the used water storage tank;
- an inverted, vertically elongated tube arranged within the sink station alongside the used water tank, the tube having one open end opening into a lower end of the used water tank to form an inlet and a second open end forming an outlet, opening outside of the sink station for draining water therethrough;
- whereby used water may be siphoned from the lower end of the housing formed storage tank upwardly, and then downwardly, through the tube to the outlet of the tube when a vacuum is applied to the tube outlet.

15. A portable, stand-alone, hand-wash sink station as defined in claim 14, and including a fresh water refill inlet at the upper end of the fresh water tank and a normally closed fresh water tank drain outlet for draining fresh water from the lower end of the fresh water tank.

16. A portable stand-alone, hand-wash sink station as defined in claim 15, and including a separate used water drain outlet at the lower end of the used water tank for draining used water therefrom when desired.

17. A portable stand-alone, hand-wash sink station as defined in claim 16, and including at least one sealed window formed in a wall defining the used water tank for viewing the fresh water tank and the level of fresh water contained in the fresh water tank.

18. A portable stand-alone, hand-wash sink station comprising:
- a vertically elongated used water storage tank having an upper end portion, a lower end portion and an open interior section;
- a normally closed drain outlet at said lower end portion for draining used water from the used water storage tank when the drain outlet is opened;
- a fresh water tank arranged within the open interior section of the used water storage tank, said fresh water tank having a normally closed fresh water inlet provided at the upper end of the fresh water tank, and a normally closed fresh water drain outlet provided at the lower end of the fresh water tank for respectively filling and emptying the fresh water tank when desired;
- a wash basin above which a fresh water supply faucet is arranged, located upon an upper column disposed above the upper end portion of the used water storage tank, and with the faucet connected to the fresh water tank for providing fresh water when desired;
- a drain connection between the wash basin and the used water storage tank for draining used water from the wash basin into the used water storage tank; and
- an inverted, vertically elongated tube bent in a U-shape to provide a pair of parallel tube legs, arranged within the hand-wash sink station alongside the used water storage tank, with one leg of the tube having an open end which opens into the lower end of the used water tank, and the opposite leg having an open end which opens to the outside of the sink station;
- whereby a vacuum may be temporarily applied to said open end for siphoning used water from the lower end of the used water storage tank upwardly and then downwardly through the tube to the outlet for draining the used water from the sink station.

19. A portable stand-alone, hand-wash sink station as defined in claim 18, and with the tube having a bent portion from which the tube legs extend downwardly being normally located above the maximum level of water contained within the used water storage tank formed by the housing; whereby, water will not normally drain through the tube and out of the used water storage tank without the application of suction to the tube to provide a siphon action for causing the water to flow through and out of the tube.

* * * * *